United States Patent [19]

Stoesser et al.

[11] Patent Number: 4,499,462

[45] Date of Patent: Feb. 12, 1985

[54] CIRCUIT ARRANGEMENT FOR THE ELECTRONIC CODE LOCKING OF LOCKS

[75] Inventors: Klaus Stoesser, Langenhain-Hofheim; Heinz Vinson, Langen, both of Fed. Rep. of Germany

[73] Assignee: Battelle Institut e.V., Postfach, Fed. Rep. of Germany

[21] Appl. No.: 373,488

[22] PCT Filed: Sep. 2, 1981

[86] PCT No.: PCT/EP81/00143

§ 371 Date: Apr. 21, 1982

§ 102(e) Date: Apr. 21, 1982

[87] PCT Pub. No.: WO82/00847

PCT Pub. Date: Mar. 18, 1982

[30] Foreign Application Priority Data

Sep. 4, 1980 [DE] Fed. Rep. of Germany ....... 3033232

[51] Int. Cl.[3] ........................ H04Q 9/00; E05B 49/00

[52] U.S. Cl. .......................... 340/825.31; 340/825.64; 361/172

[58] Field of Search ...................... 340/825.31, 825.56, 340/825.64; 377/39; 361/172

[56] References Cited

U.S. PATENT DOCUMENTS 3,600,637 8/1971 Bergkvist ....................... 340/825.31
3,686,634 8/1972 Malchman et al. ............ 340/825.64
3,943,491 3/1976 Castleberry .................... 340/825.63
4,131,855 12/1978 Mamagawa ........................... 377/39
4,148,092 4/1979 Martin ................................ 361/172
4,171,468 10/1979 Reiner ........................... 340/825.64
4,197,524 4/1980 Salem ................................ 340/147
4,257,108 3/1981 Igel ...................................... 377/39
4,392,133 7/1983 Lundgren ....................... 340/825.56
4,455,588 6/1964 Mochida et al. ............... 340/825.31

FOREIGN PATENT DOCUMENTS 0030587 6/1981 European Pat. Off. .

*Primary Examiner*—Donald J. Yusko
*Attorney, Agent, or Firm*—Fisher, Christen & Sabol

[57] ABSTRACT

The circuit arrangement has a key for the serial feeding in of the code signals and is equipped with electronic arrangements for the storage of the code and for the processing of the signals. In the beginning or at the end of each sampling, a signal is produced and the temporal intervals between these signals are identified as "long", "medium" or "short." The sequence of these signal intervals, that is, the signal pauses, is compared with the stored code.

Such a code may be remembered with particular ease as the rhythm of a song or as a melody and is accordingly very personal code. The feeding-in of the code and especially the decoding is acomplished "blindly", that is without return communication.

In order to carry out the individual functions, separate construction stages or a microcomputer can be used.

17 Claims, 3 Drawing Figures

CIRCUIT ARRANGEMENT FOR THE ELECTRONIC CODE LOCKING OF LOCKS

BACKGROUND OF THE INVENTION

1. Field of the Invention

The invention relates to an electrical circuit arrangement for electronically-coded locks.

2. Prior Art

A code controlled, one-knob, electro-door-opening installation is known (German AS No. 27 21 139 and AS No. 29 52 212). In such case the code signals are fed in with a bell button, whereby either the keyed-in pulses are counted simultaneously, or after pressing the bell button, a pulse generator is put in motion which, depending on the duration of the operation of the knob, releases a certain number of impulses. After releasing, waiting and renewed pressing down of the bell button, the next number is fed into the next storage. When all code numbers are selected correctly, then finally the last storage releases the voltage supply of the electric door opener contact for a limited period of time.

In the case of such installations, a simultaneous counting of the key operation or a return report is required, in which case the release impulses may be counted by a flashing light. The decoding, that is to say the feeding in of the code to be recognized, therefore requires concentrated attention in every case, whereby the return report will still have to be hidden from unauthorized persons in order not to reveal the code.

For suitcases and briefcases, mechanically codable lockings in the form of so-called number locks are known. As a rule, they have 4 to 6 ten-digit number plates, which have to be set in a predetermined or arbitrary sequence to a certain number. The direction of rotation may also be prescribed. In the case of such number locks, they have the disadvantage that the setting of the correct number is relatively cumbersome and requires sight contact.

Number locks with electronic codings are also known, where a key is assigned to each digit of, for example, a six-digit number. For the purpose of unlocking the lock, the keys must be operated in a predetermined sequence, i.e., by repeatedly pressing down each key, the code number assigned to each digit is selected. In the case of these locks, also the feeding in of the code to be recognized requires complete attention and sight contact is required.

The programming or setting of the code in the case of the known electronically coded locks is in most cases quite complicated and, therefore, will have been done already at the factory.

BROAD DESCRIPTION OF THE INVENTION

The invention is based on the objects of overcoming the previously mentioned disadvantages of the prior art and of creating a circuit arrangement with which the unlocking can be triggered without concentrated simultaneous counting, looking at it and the need of a return report of the fed-in signals. The code should be easy to impress on one's memory and easy to learn. Yet it should be personal and have a high number of coding possibilities in order to prevent any unauthorized opening by arbitrary or systematic testing of all combinations.

In order to be able to also use such a circuit arrangement for the locking of handbags and suitcases, the power consumption moreover should be so low that the electronic needs for at least one year can be supplied with one dry battery.

The objects are solved in a surprisingly simple, technically progressive manner with the circuit arrangement of the invention, wherein a signal is produced only at the beginning or the end of every keying and the sequence of the temporal intervals between the signals, that is, the signal pulses, is used as a code, whereby one differentiates at least two pulse lengths (long, short).

According to the invention, the sequence of code signals is fed in serially with a single key. A sight contact or some other type of reporting back is not required because the number and the length of signal pulses which are produced by the operation of the key form the sequence of signals and are evaluated as a code in the manner described. The invention is based on the surprising realization that such a code, in the case of which the signal pulses or the temporal signal intervals identified and produced in the manner provided are decisive, even with a complicated structure, may be remembered very easily because such individual sequences are built up by the operation of the keys at a certain rhythm. For example, the rhythm of a song or of a melody may be fed in as a code.

It has turned out, and this was not expected in any way, that the pauses between the signals produced in a rhythm or sequences, are individually very different in the case of a certain song, but that in the case of each person the same sequence will be maintained with high consistency over extended periods of time, independent of mood and other influences. If the circuit arrangement according to the invention has an electronic storage into which the code that is to be recognized may be individually, fed, then the coding may be very easily, quickly and inconspicuously decoded and, thus, the lock may be unlocked. Other persons would have great difficulties even if they knew the song.

Whenever according to one embodiment of the invention, the temporal intervals between the signals released during the operation of the key are identified as short, medium or long pauses, whereby "short" signifies between 0.05 to 0.1 s, "medium" between 0.1 and 0.2 s and "long" between 0.2 and 0.4 s, one will obtain an exceedingly safe coding against unauthorized decoding.

In order to keep the power consumption at a minimum, the unlocking is released advantageously upon recognition of the code by a short impulse and, after a predetermined time, it is again completed by another impulse or a sequence of impulses. The unlocking and also the locking may be triggered automatically after recognition of the code, or it will only be prepared thereby and may be made dependent on a renewed operation of the key or of an additional key. According to a further advantageous embodiment of the invention, a monitoring of the voltage is provided which upon exceeding a predetermined threshold value, triggers the unlocking, prepares it and/or signals it. It might also be sufficient, in the case of dropping below the threshold value, merely to prevent a renewed locking. Furthermore, it is be advantageous to check the supply voltage automatically after each closing operation under load and/or regularly at fixed time intervals without load or with a slight load. In a special type of embodiment of the invention and in the case of the dropping of the supply voltage to a threshold value which is 70 to 90 percent of the rated voltage, all functions are turned off, and upon renewed operation of the keys or application of an outside voltage source, return to the normal operating state takes place. The storage content up to the dropping of the voltage to 30 to 50 percent of the rated value will be maintained.

As a further safety feature, one may additionally preprogram a mechanically secured emergency program with which even after a total failure of the supply voltage—upon connection to an outside source—unlocking is accomplished.

The circuit arrangement according to the invention may be equipped with a time counter which in the case of each keying is set back and, after a predetermined period of time, erases the total feed in, whereby the returning of the time counter after recognition of the code is prevented. In an alternative embodiment, the circuit arrangement according to the invention contains a microcomputer for the storage and processing of the signals.

Whenever an electronic storage is provided, it is possible to feed a new code into the storage merely by the operation of an assigned function reversing switch. On the other hand, a mechanically adjustable storage may also be provided in the case of which the code may be changed with the help of switches, wire bridges, etc.; this has the advantage that even in the case of current failure or change of the battery, the code is preserved.

In order to make possible the learning of the functions or the practicing of the electronic coding and decoding, a switch has been provided according to an additional embodiment of the invention. After the operation of such switch a locking is prevented—for the recognition of the required feed-in of the code, an indicating signal is triggered. Finally, in an additional embodiment the circuit arrangement can be constructed such that the locking may be triggered only after the feeding in of the decoding signals following the programming.

The invention involves a circuit arrangement for the electronically-coded closing of locks which is equipped With a key for the serial feeding-in of the code signals as well as with electronic arrangements for storing the code to be recognized for the unlocking and for the processing of the signals. The decoding signals are compared with the stored code in order to decide and to trigger the unlocking in the case of agreement of the decoding signals with the stored code (decoding). The circuit arrangement according to the invention is especially useful for handbags, suitcases and other portable containers, but it can also be used for door locks, car locks and other types of closures.

BRIEF DESCRIPTION OF THE INVENTION

Further characteristics, advantages and possibilities of application of the invention will become clear from the following description of additional details on the basis of the attached drawings.

Figure 1:
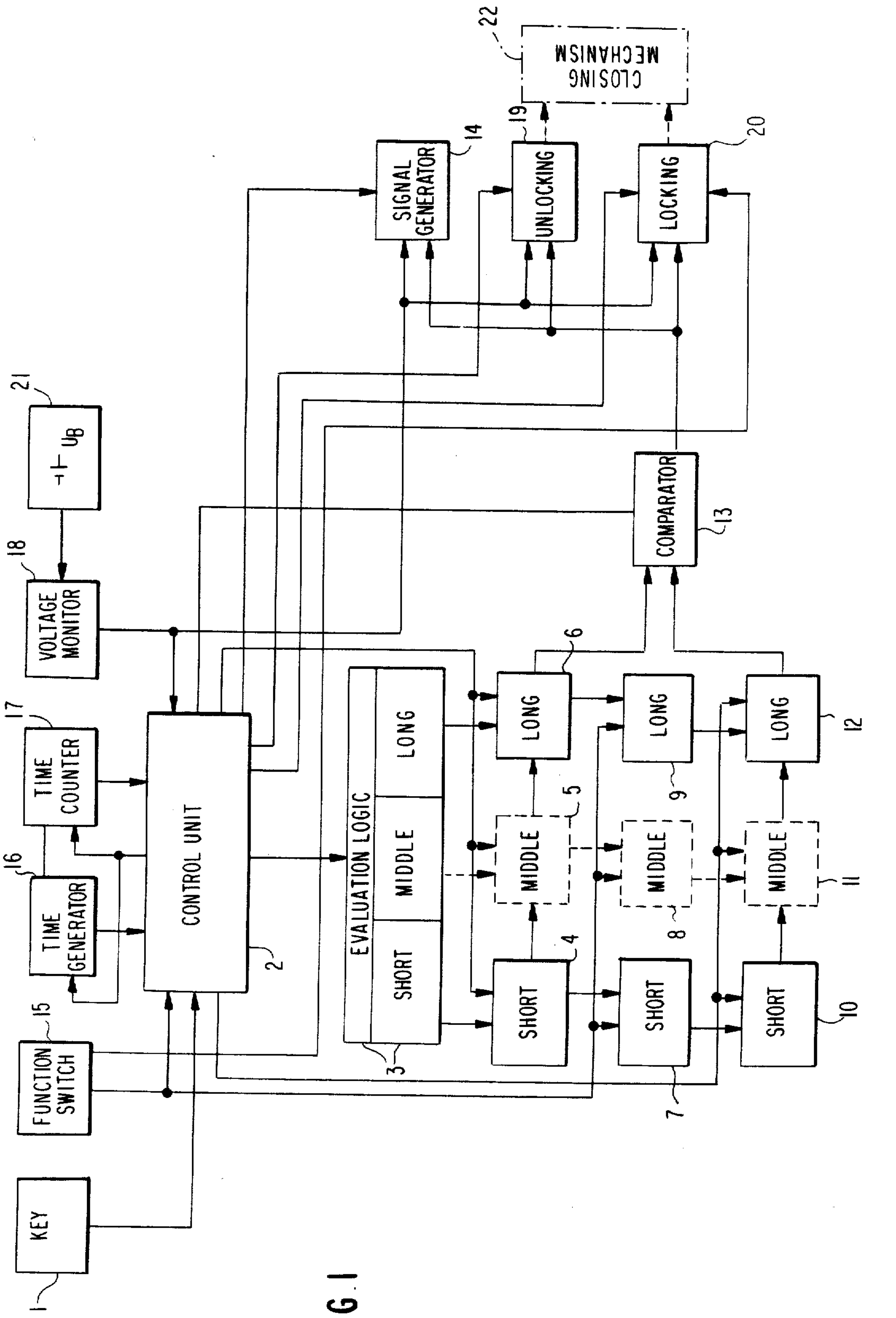
FIG. 1 is a block diagram of a circuit arrangement according to one embodiment of the invention.

In the embodiment shown in FIG. 1, by way of example, the circuit arrangement according to the invention consists essentially of key 1 for the serial feeding-in of the code signals, control unit 2, evaluation logic 3, several slide 4 to 6 and 10 to 12, storages 7 to 9, comparator and-deciding circuit 13 and signal generator 14. Furthermore, a type of operation or function reversing switch 15, rhythm generator 16, time counter 17, voltage monitor 18, unlocking and locking unit 19 or 20 are present. The current supply is indicated by numeral 21, and the closing mechanism controlled by the circuit according to the invention is indicated by numeral 22.

In the embodiment of the invention shown here, electronic storages 7 to 9 are provided for the coding. For the coding, operating type switch 15 is moved into the "programming" position and then the desired signal sequence is keyed in. In control unit 2, the fed in signal is recognized as a "long", "medium" or "short" signal, and with the help of timing pulse generator 16, a corresponding pulse is conducted to evaluation logic 3. In the case of the following keying, the temporal recognition, i.e., "long", "medium" or "short", is taken over into pertinent slide register 4, 5 or 6. After insertion of the last keying, the information stored in slide registers 4 to 6 is read into programming storage 7, 8 or 9 and is filed there.

At the beginning of the programming, i.e., the first operation of key 1, moreover in the embodiment shown, signal generator 14 is activated. After completion of the feeding-in and in connection with time counter 17 and control unit 2, signal generator 14 is set back after about 3 s and thus releases the system for the function "test" or "operation", which is described below. The coding now is completed and switch 15 is turned from the position "programming" into the position "test" or "operation."

Whenever the pause between succeeding keyings is greater than about 3 sec., such is considered a faulty input. In this case, the entire system is returned to the starting position under the influence of time counter 17 and thus the hitherto prevailing input is erased. The coding can start anew.

After switching switch 15 into the position "test" or "operation", it is necessary for unlocking or the triggering of an unlocking signal, to insert the code that is to be decoded by way of key 1. At the same time, again as it had been described in connection with the coding, the keyed pauses identified as "short", "medium" or "long", are again introduced with the help of rhythm generator 16 of control unit 2 and of evaluation logic 3 into pertinent slide register 4, 5 or 6. The reading over of the information from slide registers 4 to 6 into programming storages 7 to 9 is prevented, however, contrary to the coding process and instead of that, the comparison between the coding signals and the coding contained in storages 7 to 9, that is to say the code to be recognized, is introduced. For this purpose, the information filed in program storages 7 to 9 is read into programming slide registers 10 to 12 and is compared with the help of comparator 13 with the information in slide registers 4 to 6.

Whenever switch 15 is in the position "operation" and in case of aggreement of the read in and of the stored signals, unlocking 19 will be activated by way of control unit 2 and an unlocking pulse or pulse sequence is produced. At the same time, the user receives a signal for the recognition of the stored code by way of signal generator 14 and thus an invitation is given for the opening of the locking mechanism. After completion of the time period predetermined by time counter 17 of about 3 sec. the signal is extinguished in signal generator 14 and in construction step 20 a locking pulse is triggered or prepared; in a type of embodiment not shown here, the locking impulse is released only after a renewed depression of key 1. Whenever the keyed in pulse sequence does not agree with the stored code, the entire system is returned to the starting position by way of time counter 17 after completion of a few seconds without any unlocking pulse being delivered or a signal released.

In the third position designated as "test" of the operating type of function reversing switch 15 and in the case of agreement of the read in and of the stored codes, that is to say, in the case of recognition of the code, signal generator 14 is merely activated. Unlocking and locking pulses are not released; the unlocked state is maintained.

In the position, the "test" user is to familiarize himself with the electronic coding and decoding without the container being closed permanently, at least for the life span of the battery by a no longer reproducible signal sequence fed in as coding.

In order to guarantee the opening of the container whenever falling below a certain voltage of current supply 21, which in this case contains a battery, as soon as the voltage falls below a threshold value, the unlocking is triggered and a renewed locking is prevented. At the same time, it is possible to activate the signal generator which then, for example, produces a flickering signal or triggers an optical signal by an impulse which remains recognizable even in the case of a completely discharged battery.

In place of electronic storages 7 to 9, it would also be possible to use a mechanical coding switch or a coding field which is changeable and adjustable with the help of soldering bridges. The change of the coding would be more cumbersome, however the coding would be preserved even in the case of failure of the current supply, for example, in the case of a change of the battery. In this case, one could renounce the automatic unlocking in the case of the dropping of the supply voltage, whenever the current supply could be produced by way of outside contacts even in the case of a locked lock. It is conceivable that such an embodiment would be preferred by some users or that it would have advantages for certain cases of application.

It has now turned out to be advisable first of all to block the position "operation" of function switch 15 in the case of delivery of the lock to the user with the switching arrangement according to the invention. Only after precise knowledge of the operating instructions and of several successful decoding processes, which in the position "test" are indicated optically or acoustically by signal generator 14, should the function "operation" be released.

Figure 2:
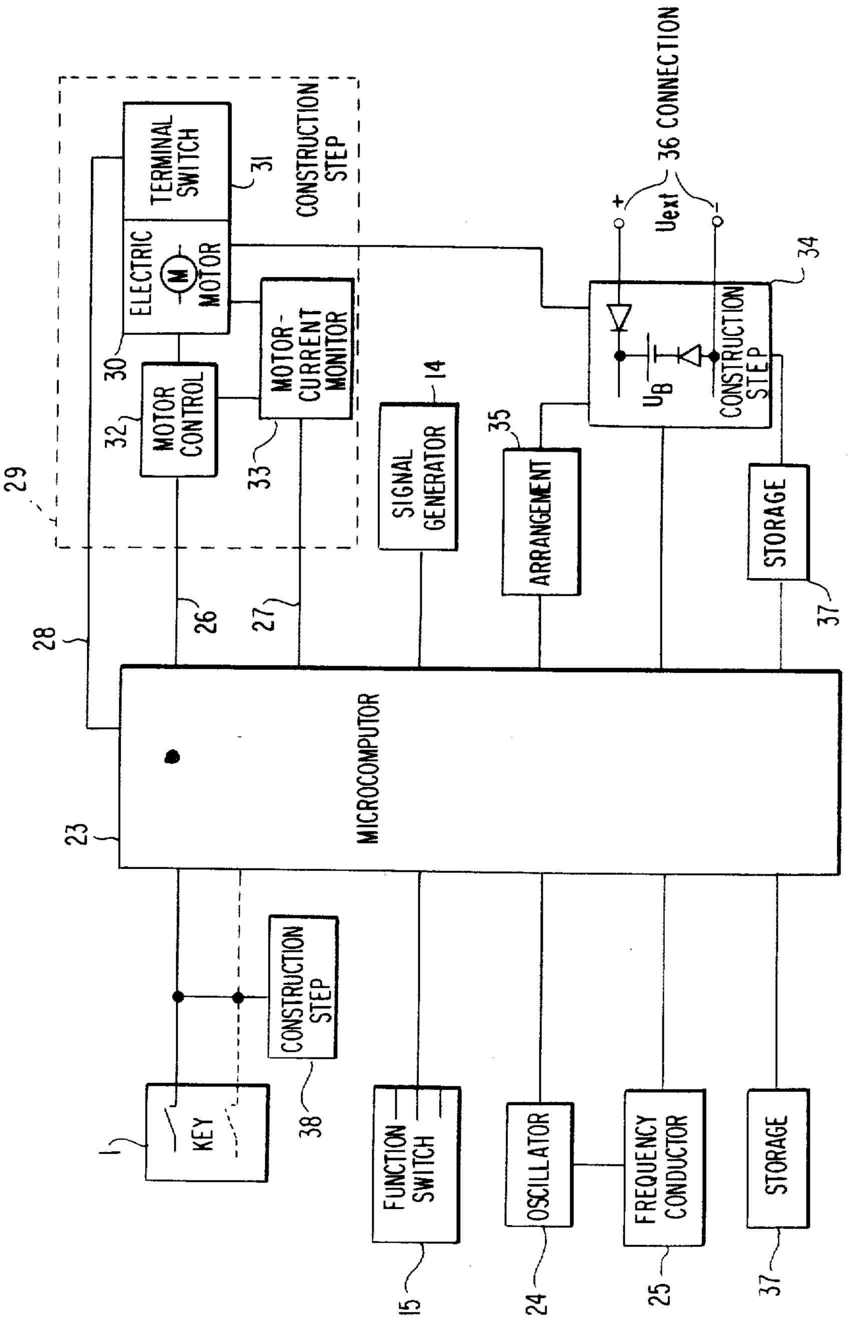
FIG. 2 is a block circuit diagram, of an embodiment of the invention in which a microcomputer is used as a storage means and for controlling the various functions.

In the embodiment of the invention shown in FIG. 2, all of the essential functions are controlled by microcomputer 23. Again the coding and decoding signals are fed in serially by way of key, 1. With the key indicated in block 1 in a broken line, auxiliary functions or additional devices can be controlled.

Even in this type of embodiment, switch 15 for the type of operation has been provided which has the positions "coding", "test" and "operation".

In order to achieve a particularly high frequency stability, oscillator 24 can be externally attached to microcomputer 23. From oscillator 24 effectively with the help of frequency conductor 25 is derived a lower operating frequency of microcomputer 23 which is more favorable for the intended purpose of use. In the case of a lower frequency, the consumption of the current is reduced.

The locking and unlocking signals are fed in by way of line 26 of construction step 29 which is framed in a broken line in FIG. 2. The closing mechanism in this case contains, as an essential element, electric adjusting motor 30 which shifts a locking bolt (not shown) axially—depending on the direction of rotation—from one into the other terminal position, whereby the pertinent terminal position is reported back by way of terminal switch 31, for example, a Hall-effect-position switch, by way of line 28 to microcomputer 23. The control, in this case motor control "right/left", is symbolized in FIG. 2 by the numeral 32. Additional motor-current monitor which, 33 for example, begins to function in the case of "jamming" of the closing mechanism and which causes a reversal of the direction of rotation or a turning off either by way of microcomputer 23 (connection line 27) and motor control 32, in order to prevent an overloading of the motor and a premature consumption of the batteries.

For the power supply, construction step 34 has been provided. It contains, as a preferred embodiment of the invention, four successively connected 1.5 V batteries. In order to be able to recognize in time the consumption of the batteries, according to a further embodiment, the voltage is measured regularly with the help of arrangement 35 likewise controlled by microcomputer 23, and the battery is tested. For this purpose, in the case of every start of motor 30 and after a delay of about 100 ms, that is to say, after completion of the starting phase of the adjusting motor, the voltage is measured. In the case of the voltage falling below a threshold value, which lies at 4.8 V whenever the rated voltage amounts to 6 V, an acoustic or optical signal is released by way of signal generator 14 and at same time the renewed locking, but not unlocking, is prevented. Since in the embodiment described here by way of example, the code which had been programmed in, is preserved up to the dropping of the voltage to below 2.7 V—after the connecting of an external battery, a grid device or something similar, the normal function can again be re-established by way of connection 36. After the dropping of the voltage to below 2.7 V, this path to be sure is blocked; the coding is erased, which should effectively lead to the opening of the lock (after application of a power source).

In order to make possible an unlocking of the lock only to those authorized even after complete failure of battery 34, a hardware emergency program according to FIG. 2, namely storage 37 with a mechanically secure, firmly programmed code has been provided. After the erasing of the code electronically stored in the microcomputer because of a total failure of the voltage supply or after the lowering of the voltage to below 2.7 V, the lock remains closed and may be unlocked after connecting it to an outside voltage source only with the help of the emergency code. This is advantageous especially in the case of the use of a circuit arrangement according to the invention for briefcases, suitcases, etc., which has not been used for some extended time—it might happen that the lowering of the battery voltage to below 2.7 V will not be recognized in time.

In still another embodiment of the invention, additionally every 24 hours and independently of the operation of the lock or motor 30, the battery voltage is checked without load and in case that it falls below the threshold value of 4.8 V, all functions are turned off. As a result of that, the very low current needed in the rest position for the "internal routine" is reduced again by microcomputer 23 by at least a power of ten to the current needed in order to maintain the stored code. In an embodiment given by way of example, the rest current was lowered from 30 $\mu$A to 1 $\mu$A. By this measure it is possible to preserve the electronically stored code even in the case of an aged, weak battery for many months or even a year. In the case of a renewed use of the lock, all functions are turned on again and in case the supply voltage still lies between 2.7 and 4.8 V, the unlocking and possibly even—up to a certain border value—a renewed locking is made possible.

The circuit arrangement according to FIG. 2 contains additionally solar cell 37 with which in connection with chargeable cells instead of battery 34, the entire power for all functions of the circuit arrangement according to the invention, including operation of adjusting motor 30, may be produced. Voltage source 34 in this case serves only as a buffer. A button cell will be sufficient which, despite its slight dimensions, has a useful life of several years.

In order to make use of the manifold possibilities of a microcomputer, electronic auxiliary arrangements, for example, an electronic watch, may be integrated into the circuit arrangement at a slight additional expenditure. After reversing operating switch 15 (type of operation "clock") disposed in the inside of the suitcase by way of key 1, this clock may be set. A frequency stable signal for the control of the clock may be derived from oscillator 24 which is present in any case with frequency divider 25. With this clock, it would also be possible to limit the operation of the mechanism to preselected times; this is of importance when using the switching arrangement according to the invention for safes.

Furthermore, in the case of the circuit arrangement according to FIG. 2, provision has been made to switch microcomputer 23 only after operation of feed-in key 1 by way of construction step 38 from a standby position into the operating position in which the inside routine is fully completed and at the required speed. This measure also, serves the goal of reducing the power consumption.

Although provision has been made according to the invention of feeding in the signals serially with the help of only one key 1, it might be of advantage in special cases to signalize or to control certain functions with the help of the additional key drawn in 1 in a broken line; for example, the completion of the feeding in of the code, taking over the code, unlocking the lock independently of the point in time of the decoding, etc.

Figure 3:
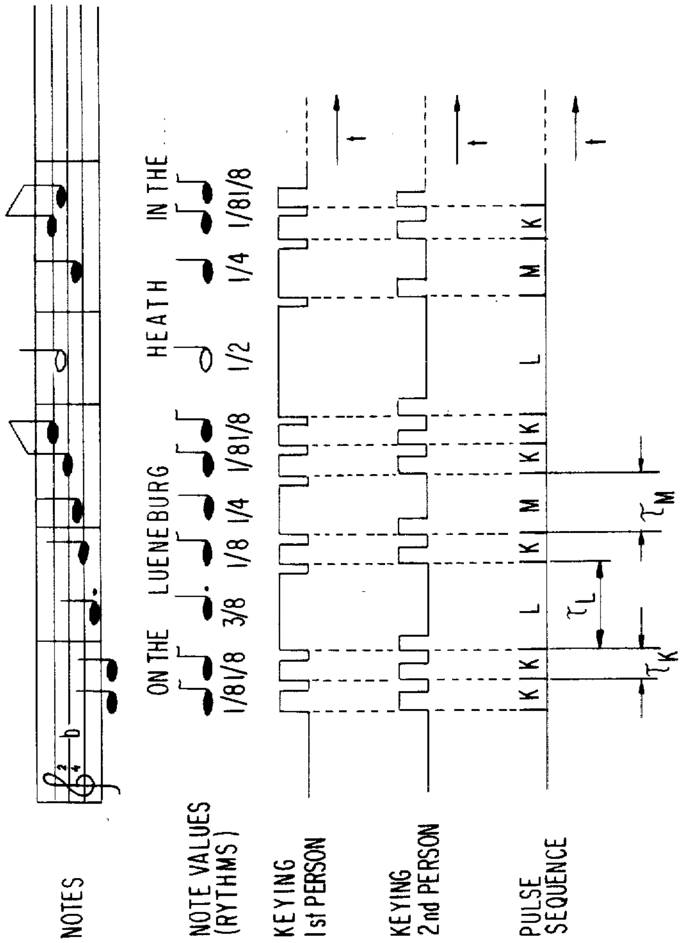
FIG. 3 shows a sequence of signals, derived from a melody, which are suitable as coding.

A signal sequence which would be very difficult to reproduce by an unauthorized person may be derived as shown on the basis of FIG. 3, for example, from a song. Upon operation of key 1 in the rhythm of such a song, a characteristic sequence of short, medium and long pulse pauses develops, which are symbolized in FIG. 3 with K, M, L and their duration with $\tau_K$, $\tau_M$ and $\tau_L$ and the sequence of which represents an individual code. It turned out that the temporal intervals or pauses between the impulses formed in the manner described, but not the sampling times or sampling pauses (that is to say the times during which the key is depressed or released), do not differ in an exploitable manner and, therefore, are not suitable as coding for a circuit arrangement of the type according to the invention. It is clear from FIG. 3 that in the case of several persons, the sampling times and sampling pauses are individually very different without this having an effect on the code determined according to the invention. In the example explained on the basis of FIG. 3, the pulse is triggered in the beginning of each sampling. It is therefore without any effect for the signal sequence, that is to say for the temporal intervals between the pulses, whether or not the user operates the key in a rhythm always only for a short period of time (second person in FIG. 3) or with a variable duration corresponding to the value of the note (first person in FIG. 3).

Since in the first case the sampling pauses (first person) and in the second case the duration of each key operation (second person) are almost constant, the same sequence of pulses would develop also in the case of pulse formation at the end of each sampling—apart from the first and the last signal—and could be used as a code.

The number of required samplings or the length of the signal sequence consisting of variable long pauses, depends on the storage capacity of the electronic construction elements used. In order to make possible a number of combinations sufficient for an effective coding, in many cases of application storages with 8 bits will suffice.

Whenever in the case of the sampling the number of the storable signals is reduced, this is without significance because in the type of embodiment according to FIG. 1, after the last processible sampling or after recognition of the code, time counter 17 is stopped and signal generator 14 is activated. The microcomputer in the embodiment according to FIG. 2 likewise triggers the unlocking after recognition of the code without regard to the feeding-in of additional signals.

We claim:

1. A lock, comprising:

a supply voltage;

a manually operable key which includes an electrical switch adapted to be manually operated selectively to open or close an electrical circuit; each operation of said switch producing an input signal;

a means for storing a reference code;

a locking signal generator adapted to be triggered to generate a locking signal;

an unlocking signal generator adapted to be triggered to generate an unlocking signal;

an electronic means for classifying temporal intervals between successive ones of said input signals produced by actuations of said key into a plurality of groupings;

a comparator; said comparator being adapted to generate a signal to selectively trigger an unlocking signal or a locking signal;

said electronic means for classifying supplying said classified input signals to said comparator;

said comparator being adapted to compare said stored reference code to said classified input signals;

said comparator triggering said unlocking signal when said stored reference code is identical to said classified input signals;

a latch adapted to be selectively moved to an open condition or a closed condition;

a means for operating said latch selectively to an open condition or a closed position;

said means for operating being actuated selectively by said unlocking signal or said locking signal in an opening operation or a closing operation, respectively;

whereby when entry of input signals by operation of said key matches said stored reference code, said latch is triggered by an unlocking signal from said comparator to be operated to an open condition by said means for operating.

2. A lock as claimed in claim 1, wherein said supply voltage is automatically checked by a means for checking regularly at fixed time intervals.

3. A lock as claimed in claim 1 wherein the temporal intervals between said input signals released when hitting the key, are identified by said evaluation lock as short ($\tau_K$), medium ($\tau_M$) or long ($\tau_L$) pauses wherein "short" signifies between 0.05 and 0.1 second, "medium" between 0.1 and 0.2 second and "long" between 0.2 and 0.4 second.

4. A lock as claimed in claim 1 wherein, upon recognition of the reference code by said evaluation logic, the unlocking signal being selectively triggered and ended by short electrical pulses.

5. A lock as claimed in claim 1 wherein the unlocking signal is triggered automatically immediately upon recognition by said comparator of the reference code and is terminated again after passing of a predetermined time.

6. A lock as claimed in claim 1 wherein the unlocking signal is triggered automatically after recognition of said reference code and is completed after passage of a predetermined time by renewed operation of said key.

7. A lock as claimed in claim 1 wherein the unlocking signal is triggered after recognition of the code by said comparator by further operation of the key and is again completed after the course of a predetermined time by renewed operation of the key.

8. A lock as claimed in claim 1 further comprising a voltage monitor which selectively triggers, in event of the voltage falling below a predetermined threshold value, in the closed condition the unlocking, and which, in the open condition, after the unlocking signal, prevents operation of a locking signal.

9. A lock as claimed in claim 1 wherein said supply voltage is automatically checked by a means for checking after every closing operation and regularly at fixed time intervals.

10. A lock as claimed in claim 1 wherein, upon the dropping of said supply voltage to a threshold value which lies at 70 to 90 percent of a nominal operating voltage, all functions are turned off, whereby, however, the contents of said means for storing a reference code up to the dropping of the voltage to 30 to 50 percent of the rated value are preserved and wherein through a renewed operation of said key or by application of an outside voltage source ($U_{ext}$), the return into a normal operating state takes place.

11. A lock as claimed in claim 1 wherein additionally a mechanically ensured emergency program is preprogrammed with which after complete failure of the supply voltage, the unlocking signal is triggered.

12. A lock as claimed in claim 1 wherein a time counter which, upon each operation of said key, is set back and after a predetermined period of time erases the total of said input signals and wherein the resetting of said time counter is prevented after recognition of the said reference code.

13. A lock as claimed in claim 1 wherein a microcomputer is used for the storage and processing of the signals.

14. A lock as claimed in claim 1 wherein an electronic storage is present into which a new reference code is inserted with the help of an insertion key after operation of a function reversing switch.

15. A lock as claimed in claim 1 wherein a mechanically adjustable storage is provided as a storage for said reference code to be recognized and wherein said reference code is changeable.

16. A lock as claimed in claim 1 wherein a switch is present, after the operation of which a locking signal is prevented and, in the case of feeding in the code to be recognized, an indicating signal is released.

17. A lock as claimed in claim 1 wherein an electronic code storage is used and wherein said locking signal can be released only after entry of a decoding signal following programming.

* * * * *